US006762384B1

(12) United States Patent
Kechel

(10) Patent No.: US 6,762,384 B1
(45) Date of Patent: Jul. 13, 2004

(54) METHOD OF PRESORTING MAIL FOR MINIMIZED EFFORT TO SEQUENCE MAIL FOR DELIVERY

(75) Inventor: Ottmar Karl Kechel, Irving, TX (US)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/669,205

(22) Filed: Sep. 25, 2000

(51) Int. Cl.[7] .............................. B07C 5/00; G06K 9/00

(52) U.S. Cl. ........................ 209/584; 209/900; 700/221; 700/219; 700/220; 700/225; 700/226

(58) Field of Search ......................... 209/559, 563–566, 209/584, 900; 271/3.01

(56) References Cited

U.S. PATENT DOCUMENTS

| | | | | |
|---|---|---|---|---|
| 5,119,954 A | | 6/1992 | Svyatsky et al. | 209/584 |
| 5,143,225 A | | 9/1992 | Rabindran et al. | 209/584 |
| 5,150,891 A | | 9/1992 | Svyatsky et al. | 271/35 |
| 5,190,282 A | | 3/1993 | Rabindran et al. | 271/272 |
| 5,363,971 A | | 11/1994 | Weeks et al. | 209/584 |
| 5,651,445 A | | 7/1997 | Stevens et al. | 198/447 |
| 5,659,163 A | | 8/1997 | Lagan et al. | 235/375 |
| 5,667,078 A | | 9/1997 | Walach | 209/584 |
| 5,852,826 A | | 12/1998 | Graunke et al. | 707/7 |
| 6,135,292 A | * | 10/2000 | Pettner | 209/900 X |
| 6,195,174 B1 | * | 2/2001 | Johnson et al. | 209/657 X |

FOREIGN PATENT DOCUMENTS

| | | | |
|---|---|---|---|
| EP | 575032 | * 12/1993 | 209/584 |

* cited by examiner

*Primary Examiner*—Donald P. Walsh
*Assistant Examiner*—Jonathan R Miller
(74) *Attorney, Agent, or Firm*—Philip G. Meyers

(57) ABSTRACT

A method for use by a presort mailer in creating a mailing consisting of a multitude of mail pieces addressed to a predetermined list of recipients having predetermined addresses is disclosed, including the steps of: (a) determining a batch scheme applicable to the mailing, wherein the batch scheme specifies batches of mail pieces to be grouped together, the batch scheme being based on a multi-pass mail piece sort scheme such that each batch contains mail pieces that can be sorted to mail carrier delivery order on a last pass of the multi-pass sort scheme; and (b) creating the mail pieces of the mailing in an order so that the batches of mail pieces to be grouped together according to the batch scheme are created consecutively. In one embodiment, the multi-pass sort scheme may be based on a predetermined set of numbered delivery points each corresponding to a ZIP+4 destination code. The mail pieces may be created by printing addresses on a multitude of otherwise identical mail pieces in the order determined by the batch scheme, and the multi-pass sort scheme may be a two-pass sort scheme including a first pass sort based on a first significant digit of a delivery point number, and a second pass sort based on a second significant digit of the delivery point number; the batches of mail pieces being created in an order suitable for the second pass sort as if such mail pieces had been sorted in the first pass sort.

7 Claims, 3 Drawing Sheets

METHOD OF PRESORTING MAIL FOR MINIMIZED EFFORT TO SEQUENCE MAIL FOR DELIVERY

BACKGROUND OF THE INVENTION

Each day more than 200,000 United States Postal Service (USPS) carriers deliver mail to approximately 100 million individual domestic addresses. Before a carrier begins to walk through or drive through his or her delivery route, it is the carrier's responsibility to put all of this mail into an appropriate sequence for efficient delivery. Under the present USPS procedure, the carrier assembles at least three delivery order sequenced stacks of mail, including letters, flats (including enveloped and non-enveloped magazines), and parcels.

A substantial percentage of the mail deliveries the USPS delivers on a regular basis consists of presorted mass mailings. These mass mailings typically consist of advertisements, promotional materials, solicitations, bills and similar materials. Such mailings are printed and/or addressed in accordance with a presort scheme to aid in delivery of the mailings and/or presorted in some cases down to the delivery point. The presort scheme is normally by destination address and the mailings are presented to the national postal service accordingly. Thus, the mail carrier, in addition to the above-referenced stacks of mail, also has one or more additional sequenced stacks, e.g., pre-sorted mass-mail items to be delivered to many or all of the stops on the delivery route the carrier collates the items for that address from each of the various stacks either in the post office or on the route and puts them all into the postal patron's mailbox. This collating and/or sorting and shuffling through various stacks of mail is time consuming, inefficient, and consequently expensive to the USPS. Consequently, any reduction in the number of sequenced stacks that have to be sorted and shuffled through during delivery represents the potential for increased efficiency.

Presorted mail typically consists of mass mailings of sales materials, promotions and similar material. Current practice in the United States is for the mailing entity, e.g., presort mailer, to sort mass mailings according to destination based upon zip codes and addresses. For these mass mailings the carrier receives, for example, a stack of mail from a mass mailer that has been presorted by destination by zip+4+2 coding. Thus, the carrier has another stack of mail to shuffle through at each delivery stop.

To put mail in destination point order, a Delivery Bar Code Sorter (DBCS) and/or Carrier Sequence Bar Code Sorter (CSBCS) machine typically uses a multi-pass sorting scheme. Two- and three pass schemes based on significant digits of the delivery points are most common. These known strategies are explained in detail in U.S. Pat. No. 5,363,971, issued Nov. 15, 1994. In general, a multi-pass sort scheme starts with a disordered collection of mail have a common zip code and ends up with the same mail in a series of batches, one for each delivery point receiving mail. In order to accomplish the sort, intermediate batches of partially sorted mail are created that are then fed back into the sorter again for sorting according to a second pass sort scheme.

One potential way of eliminating an individual stack of presorted mail would be to sort the presorted mail, together with all unsorted mail, using existing equipment and processes, for example, a Delivery Bar Code Sorter (DBCS) and/or Carrier Sequence Bar Code Sorter (CSBCS). However this would entirely eliminate the purpose of presorting mail, i.e., to reduce the amount of sorting that has to be done by the mail service. Consequently, there exists a need for a method of reducing the number of individual stacks of mail to be handled by the mail carrier without adding additional mail sorting and handling equipment.

SUMMARY OF THE INVENTION

The invention provides a method for use by a presort mailer in creating a mailing consisting of a multitude of mail pieces addressed to a predetermined list of recipients having predetermined addresses, including the steps of:

(a) determining a batch scheme applicable to the mailing, wherein the batch scheme specifies batches of mail pieces to be grouped together, the batch scheme being based on a multi-pass mail piece sort scheme such that each batch contains mail pieces that can be sorted to mail carrier delivery order on a second or subsequent pass of the multi-pass sort scheme; and (b) creating the mail pieces of the mailing in an order so that the batches of mail pieces to be grouped together according to- the batch scheme are created consecutively. Most preferably, each batch is created according to the first pass sort scheme so that each is ready for the second pass sort, regardless of whether a two- or three-pass sort scheme is used. It is not preferred to create each batch ready for the third pass of a three-pass sort because the individual batches in such a case would be too small.

In the above method, the multi-pass sort scheme may be based on a predetermined set of numbered delivery points each corresponding to a ZIP+4+2 destination code or other identification code, such as an identification code (ID-Tag) with a respective database containing the information associated with the code, or a "fingerprint" with a respective database containing the unique assignment from fingerprint to delivery point number. In one aspect, the mail pieces are created by printing addresses on a multitude of otherwise identical (or nearly identical) mail pieces in the order determined by the batch scheme. In one refinement, the multi-pass sort scheme is a two-pass sort scheme including a first pass sort based on a least significant digit of a delivery point number, and a second pass sort based on a the next higher significant digit of the delivery point number. The batches of mail pieces are created in an order suitable for the second pass sort as if such mail pieces had been sorted in the first pass sort.

In another embodiment, a presorted mailing of the invention comprises a number of groups of mail pieces, generally generated consecutively and kept together prior to shipment as described hereafter. Mail pieces in each group are addressed to different set of destination zones than mail pieces in other groups, and each group comprises a number of batches of mail pieces. Mail pieces in each batch are addressed to a predetermined list of recipients having predetermined addresses within a single delivery zone, and the addresses in each batch are determined according to a multi-pass mail piece sort scheme such that each batch contains mail pieces that can be sorted to mail carrier delivery order on a last (generally second and third) pass of the multi-pass sort scheme. Within each group, the batches are ordered consecutively for sorting on the second (or second and third) pass of the multi-pass sort scheme.

In another aspect, the invention provides a method of sorting mail including the steps of:

(a) utilizing the sorting criteria applied in the first n−1 sorting passes of a carrier delivery destination multiple pass sorting process having n sorting passes to create a plurality of mail pieces having different destination addresses, the mail pieces being created in batches corresponding to the criteria used in the first n−1 sorting passes;

(b) integrating the batches of mail pieces with batches of similarly ordered mail prior to the second (or second and third) sorting pass(es) of the carrier delivery destination multiple pass sorting process, and (3) sorting the combined batches of mail in the second (or second and third) pass(es) of the carrier delivery destination multiple pass sorting process.

According to a preferred form of this general method, a method of integrating presorted mail with other mail during a multi-pass sort includes the steps of:

(a) determining batch schemes applicable to a plurality of groups G of a mailing M, wherein each batch scheme specifies batches B of mail pieces to be grouped together within each group G, each batch scheme being based on a multi-pass mail piece sort scheme such that each batch contains mail pieces that can be sorted to mail carrier delivery order on a last pass of a multi-pass sort scheme;

(b) creating the mail pieces in order so that the batches B of mail pieces to be grouped together are created consecutively for each group G;

(c) sending each group G to one of a number of distribution centers;

(d) combining each group G at its associated distribution center with respective batches of other mail pieces ready for the last pass of the multi-pass mail piece sort scheme; and (e) executing the second (or second and third) pass(es) of the multi-pass mail piece sort scheme on the combined mail pieces. The other mail pieces may include batches of mail which have just been created in an earlier pass of the multi-pass mail piece sort scheme, batches of mail pieces created according to the invention (steps (a) to (c)) by a different presort mailer, or both. In this manner, at the distribution center, all mail intended for an individual delivery point is in a single batch and the postal carrier does not need to pull mail from several presorted stacks at each stop. These and other aspects of the invention are described and illustrated in the detailed description and drawings.

DETAILED DESCRIPTION

Figure 1:
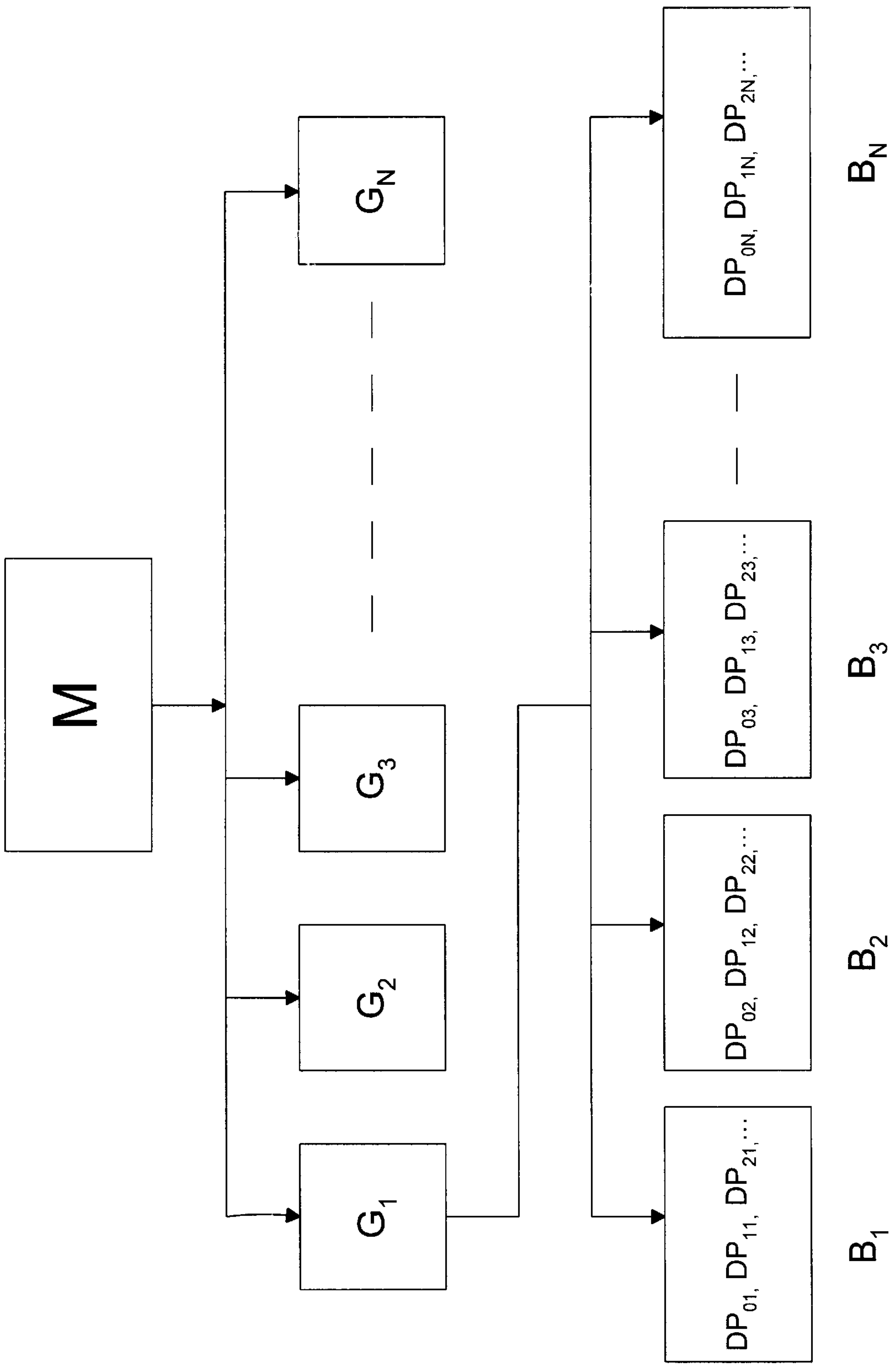
FIG. 1 is block diagram illustrating a presorted mailing according to the invention.

Current mail sorting schemes involve multiple pass sorting in which mail items are progressively sorted in a series of passes. An unsorted stack of mail items having an assigned unique delivery point sequence number, represented by e.g. a bar code is placed in a feed bin, singulated into a stream of individual pieces and scanned with an optical scanner which reads a bar code or characters appearing on the mail piece, or otherwise identifies the mail piece in order to get the delivery point sequence number. The scanned information is collected and processed, typically using a microprocessor and associated memory. The mail pieces are fed from the scanner through a series of diverters which divert individual mail pieces into bins or pockets based upon a first scanned indicia or other means. The stacks of mail from the individual bins are then manually or mechanically collected in sequence and placed in the feed bin. The mail is processed through the sorter for a second pass, during which the mail is sorted into the bins based e.g. upon a second scan of the bar code. This process may be repeated a number of times, depending upon the level of the sort, the number of destinations and the equipment used for sorting. As is known in the art, the number of destinations or categories into which items can be sorted using a multi-pass scheme is equal to the number of bins raised to the number of passes. Thus, for example, in the case of a typical carrier delivery route, containing approximately 1000 destinations, in order to sequentially sort mail for the route with two passes, a 32 bin sorter is required ($32^2$=1024).

For the purpose of illustration, assume that a carrier delivers mail to 25 destinations or numbers (1–25) on 5 streets (A–E), starting with address A-1 and proceeding by street and address number to E-25, a total of 125 destinations. A possible sort scheme to sequence the mail for delivery in this scenario could use for example, a twenty-five bin sorter in a two pass sorting scheme. During the first pass through the sorter, the mail is sorted according to the street address, i.e., 1–25. Thus, after the first pass, the first bin would contain the mail for the first address on each street, i.e., A-1, B-1, . . . E-1. The second bin would contain the mail for the second address on each street, i.e., A-2, B-2 . . . E-2. The last bin would contain the mail for A-25, B-25, . . . E-25. The stacks would not, however be sorted by street.

In the next pass, the stacks would be sequentially placed in the feed bin to be sorted by street. Since only five streets are used in the scenario, only five bins would be used in the second sort. In the second pass, the first stack from the previous pass, containing all of the "1"'s would be sorted as follows: A-1 would be diverted into the first bin, B-1 would be diverted into the second bin, C-1 to the third, D-1 to the fourth and E-1 to the fifth. The second stack from the first pass, containing mail for destinations A-2 through E-2 would be sorted in the same fashion. Thus, upon completion of the second pass with the twenty-fifth stack, the previously unsorted stack of mail would be ordered sequentially for delivery.

According to current practice, presort mailers provide stacks of mail presorted by destination, that is, in order so that the first item goes to the first delivery point on the carrier's route, the second goes to the second, and so on. During delivery, the carrier would check, by destination, each stack for mail addressed to the particular destination, including stacks of presorted mail. In order to reduce the number of individual stacks of mail to be checked by the carrier, the present invention provides for integrating the presorted mail into the mail sorting process just prior to the second sort. To do so, the presort mailer sorts the mail, not by destination in accordance with current practice, but in accordance with a sort scheme utilized by the national mail service up to the point prior to the second pass through the sorter. In the example illustrated above, the presort mailer would supply mail presorted by street address, i.e., 1–25, preferably in stacks, each corresponding to a street address. The stacks would then be integrated into the final sort and sorted by street, A-E. This eliminates the extra stack of mail that the carrier would otherwise have to distribute mail from, which in the foregoing example could contain up to 125 pieces of mail. In reality, where a carrier may deliver mail to 400 to 1000 or more destinations, the elimination of a single stack of presorted mail will result in substantial time savings.

The invention contemplates creating a single presorted mailing that comprises a number of groups of mail pieces generated at a common source (e.g., at the presort mailer) and initially grouped together. The mailing M as shown in FIG. 1 includes a plurality of groups of mail $G_1$, $G_2$, $G_3$, . . . $G_n$ each intended for a different geographic delivery zone, such as that associated with a different bar code. Each group $G_n$ includes a number of batches of mail $B_1$, $B_2$, $B_3$, . . . $B_n$ each comprising a batch according to the invention, with or without physical dividers between batches and/or groups. Each batch B of mail pieces in the mailing is addressed to a predetermined list of recipients having predetermined addresses, and the addresses in each batch are based on a multi-pass mail piece sort scheme such that each batch contains mail pieces that can be sorted to mail carrier delivery order on a second (or second and third) pass of the multi-pass sort scheme. Each batch B contains mail pieces addressed to a predetermined set of delivery points (DP). For example, as shown in FIG. 1 for a two-pass sort, the mail pieces in the first batch are addressed to delivery points $DP_{01}$, $DP_{02}$, $DP_{03}$ . . . $DP_{0N}$, the mail pieces in the second batch are addressed to $DP_{11}$, $DP_{12}$, $DP_{13}$ . . . $DP_{1N}$, and so on. Unlike the set of batches that results from the first pass sort of general mail using a DBCS machine, the content of the presorted mailing according to the invention is generally the same or at least has a comment element (for example, the same advertising is sent to all the recipients.) Custom variations in content may exist in the mailing, resulting in subgroups of identical mailings within the overall mailing M. For example, the contents of each mail piece might be somewhat different for predetermined types of recipients, such as doctors, lawyer and accountants.

Figure 2:
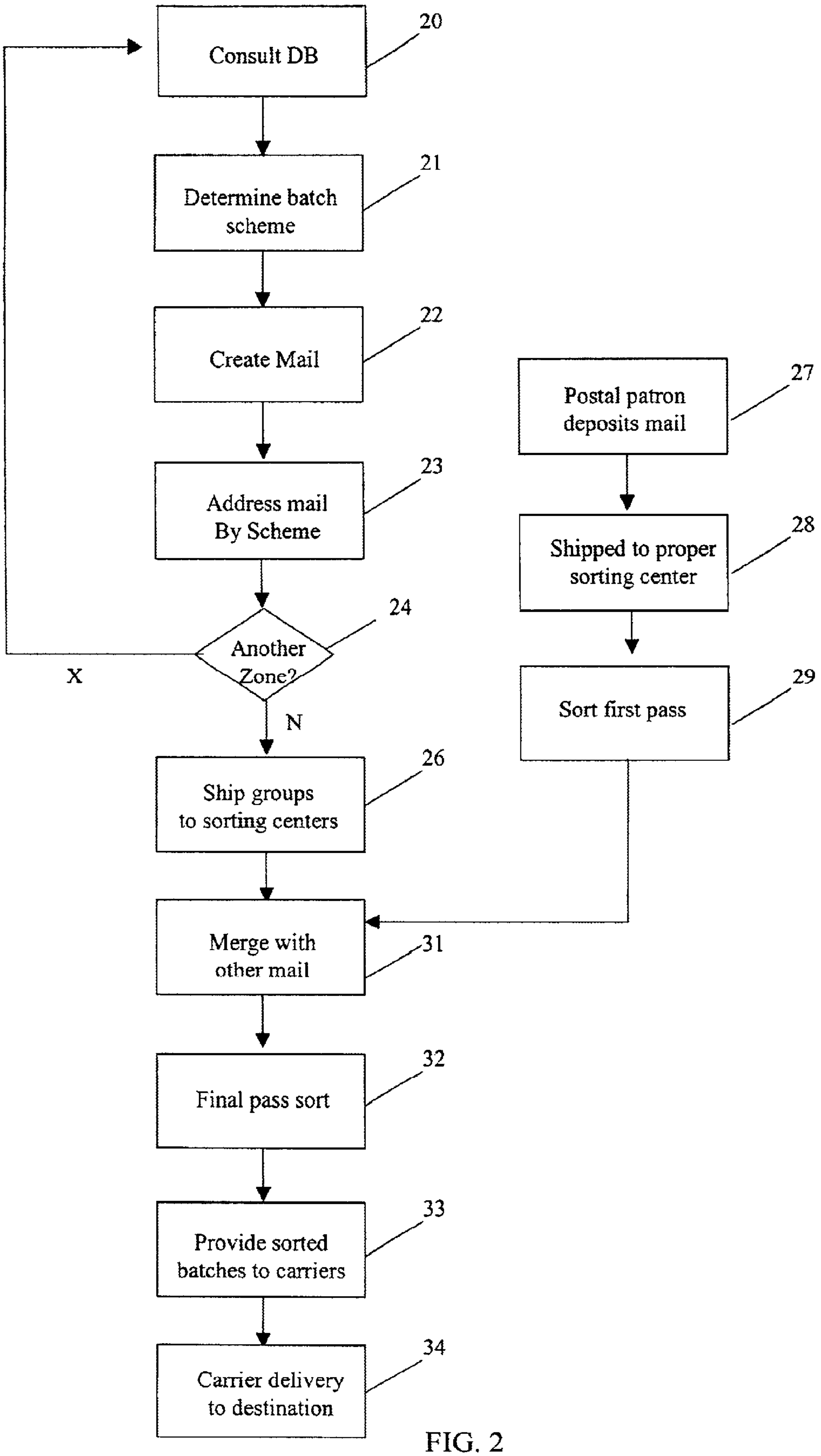
FIG. 2 is block diagram illustrating a method according to one embodiment of the invention.

FIG. 2 further illustrates the method of the invention. In step 20, a presort mailer first consults an external master database maintained by the national postal service giving the current multi-pass sort schemes for all zones (e.g., zip codes) served by the postal service. The mailer retrieves the multi-pass sort schemes for all zones to be including in its presorted mailing and determines the specific batch scheme for each zone (step 21). The mailer then creates the mail pieces to be included in the mailing (step. 22) and then addresses them consecutively, by printing or labeling step 23, according to the batch scheme for each zone. If mailings to more than one zone are to be generated, steps 20–23 are repeated at loop 24 for each zone until all groups G of mail pieces have been created.

The groups G are then shipped in step 26 to the postal sorting centers assigned to handle mail for the zone the mail is addressed to. Such centers also receive other, non-presorted mail. Such mail is deposited into the postal system by individuals (step 27) and shipped or carried to the proper sorting center (step 28). Such mail is then sorted using a multipass sort, for example, subjected to the first pass of a two-pass sort using a DBCS machine (step 29). Mail sorted in step 29 is then merged with the presorted mail (step 31) so that like batches from each are combined. Where a number of presort mailers are providing mail to the same zone, carrier, or carrier group, a separate automated collating operation may be interposed at this point so that like batches from each presort mailer are combined. The combined batches are then sorted to delivery order during the final sorting pass (or passes) (32), and the presorted mail is divided up and provided to individual carriers (step 33) for delivery to the final destination (step 34).

Figure 3:
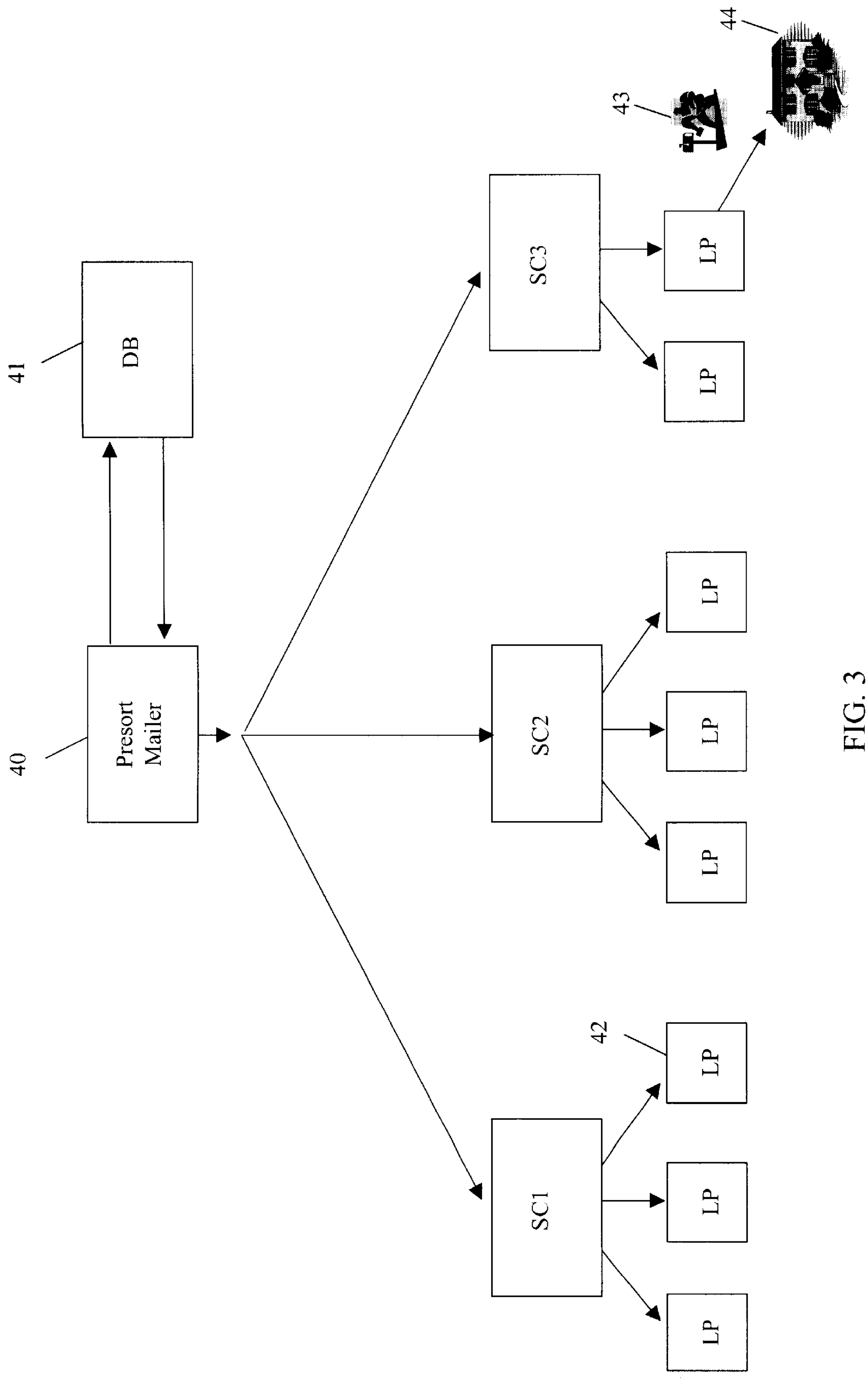
FIG. 3 is a schematic illustration of mail and information flow according to one embodiment of the invention.

The flow of mail in the foregoing example is illustrated in FIG. 3. Steps 20–24 occur at the presort mailer's site 40. Site 40 preferably communicates with a master database 41 maintained by the postal service in order to obtain current batch scheme information for all zones to which mail will be sent. This could be done, for example, through a network such as the Internet. The groups of mail $G_1$, $G_2$, $G_3$, . . . $G_n$ are then sent to each postal sorting center $SC_1$, $SC_2$, $SC_3$, . . . $SC_n$, respectively, at which steps 31, 32 are executed. The delivery order sorted mail may then be further divided and distributed to various local post offices 42 for pick up by the carriers 43, who distribute the mail to the individual destinations 44 (residences, businesses, etc.) The foregoing example is presented for illustration, and many variations on the method are possible. For example, the master mailing database used by the presort mailer to create mailings may already include the data for the multipass sort schemes used in all possible zones. Modifications of the invention may be made without departing from the spirit and scope of the appended claims.

What is claimed is:

1. A method for use by a presort mailer in creating a mailing, which mailing comprises a multitude of mail pieces addressed to a predetermined list of recipients having predetermined addresses, comprising the steps of:

determining a batch scheme applicable to the mailing, wherein the batch scheme specifies batches of mail pieces to be grouped together, wherein the batch scheme is based on a multi-pass mail piece sort scheme such that each batch contains mail pieces that can be sorted to mail carrier delivery order on a second or subsequent pass of the multi-pass sort scheme; and creating the mail pieces of the mailing in an order so that the batches of mail pieces to be grouped together according to the batch scheme are created consecutively.

2. The method of claim 1, wherein the multi-pass sort scheme is based on a predetermined set of numbered delivery points.

3. The method of claim 2, wherein each delivery point corresponds to a ZIP+4 +2 code.

4. The method of claim 1, wherein the step of creating the mail pieces comprises printing addresses on a multitude of otherwise substantially identical mail pieces in the order determined by the batch scheme.

5. The method of claim 2, wherein the multi-pass sort scheme is a two-pass sort scheme including a first pass sort based on a least significant digit of each delivery point number and a second pass sort based on the highest significant digit of each delivery point number, wherein the batches of mail pieces are created in an order suitable for the second pass sort as if such mail pieces had been sorted in the first pass sort.

6. The method of claim 2, wherein the multi-pass sort scheme is a three-pass sort scheme including a first pass sort based on a least significant digit of each delivery point number, a second pass sort based on the next highest significant digit of each delivery point number, and a third pass sort based on the highest significant digit of each delivery point number, wherein the batches of mail pieces are created in an order suitable for the second pass sort as if such mail pieces had been sorted in the first pass sort.

7. A method of integrating presorted mail with other mail during a multi-pass sort, including the steps of:

(a) determining batch schemes applicable to a plurality of groups of a mailing, wherein each batch scheme specifies batches of mail pieces to be grouped together within each group, each batch scheme being based on a multi-pass mail piece sort scheme such that each batch contains mail pieces that can be sorted to mail carrier delivery order on a second or subsequent pass of a multi-pass sort scheme;

(b) creating the mail pieces in order so that the batches of mail pieces to be grouped together are created consecutively for each group;

(c) sending each group to one of a number of distribution centers;

(d) combining each group at its associated distribution center with respective batches of other mail pieces ready for the second pass of the multi-pass mail piece sort scheme; and (e) executing the second pass of the multi-pass mail piece sort scheme on the combined mail pieces.

* * * * *